United States Patent [19]

Fiorino

[11] Patent Number: 5,507,842

[45] Date of Patent: Apr. 16, 1996

[54] PROCESS FOR CONVERTING LEAD AND LEAD OXIDES TO BARIUM METAPLUMBATE

[75] Inventor: Mary E. Fiorino, Bridgewater, N.J.

[73] Assignee: AT&T Corp., Murray Hill, N.J.

[21] Appl. No.: 203,083

[22] Filed: Feb. 28, 1994

[51] Int. Cl.$^6$ ..................................................... H01M 4/56
[52] U.S. Cl. .................. 29/623.5; 29/623.1; 429/227; 429/228; 429/234; 429/236; 429/251; 427/433; 427/443.2
[58] Field of Search ................. 427/433, 443.2; 429/227, 228, 233, 234, 236, 251; 29/623.1, 623.5

[56] References Cited

U.S. PATENT DOCUMENTS

| | | | |
|---|---|---|---|
| 4,784,717 | 11/1988 | Hirano et al. | 156/623 R |
| 5,045,170 | 9/1991 | Bullock et al. | 204/280 |
| 5,106,709 | 4/1992 | Tekkanat et al. | 429/210 |
| 5,143,806 | 9/1992 | Bullock et al. | 429/228 |

FOREIGN PATENT DOCUMENTS

WO90/13923  11/1990  WIPO.

OTHER PUBLICATIONS

D. Linden, ed., *Handbook of Batteries & Fuel Cells*, (McGraw–Hill Book Company, New York), c. 1984, pp. 14–1 to 14–105.

W. Kao et al., "Corrosion Resistant Coating for a Positive Lead/Acid Battery Elecctrode," *J. Electrochem. Soc.*, vol. 139, No. 11, Nov. 1992.

*Primary Examiner*—Prince Willis, Jr.
*Assistant Examiner*—M. Nuzzolillo
*Attorney, Agent, or Firm*—Richard J. Botos

[57] ABSTRACT

The present invention provides improved processes for forming anti-corrosion layers, particularly barium metaplumbate, on lead, lead alloy-, and lead oxide-containing substrates. The processes of the invention are used to form corrosion-resistant current collectors which are assembled into lead-acid batteries. The inventive methods used to form barium metaplumbate employ a salt solution which includes a barium compound and a solvent salt. In a first embodiment, a substrate material having at least a surface comprising elemental lead reacts with a salt solution to form barium metaplumbate. The salt solution includes a barium compound and an oxidizing agent. The solvent salt or barium compound may themselves be oxidizing agents, or an additional oxidant may be added to the solution. The molten salt solution is applied to the substrate in any known manner such as dipping, spraying, and brushing. Advantageously, a lead or lead alloy-containing substrate is dipped into a molten salt solution heated to a temperature at which a portion of the lead-containing substrate is directly converted to barium metaplumbate. In a further embodiment of the invention, barium metaplumbate is formed on a lead oxide-containing substrate. This process employs a salt solution comprising a barium compound and a solvent salt to convert lead oxide to barium metaplumbate.

22 Claims, No Drawings and Fuel Cells, (McGraw-Hill Book Company, New York), c. 1984, the disclosure of which is incorporated herein by reference.
5,507,842

PROCESS FOR CONVERTING LEAD AND LEAD OXIDES TO BARIUM METAPLUMBATE

BACKGROUND OF THE INVENTION

1. Technical Field

The invention relates to the formation of barium metaplumbate $BaPbO_3$ layers on substrates having at least a surface which includes elemental lead or lead oxides. More particularly, the invention relates to the formation of barium metaplumbate layers on lead, lead alloy, and lead oxide surfaces exposed to sulfuric acid environments such as surfaces of lead-acid battery components.

2. Description of the Related Art

Lead-acid batteries are the most commonly-used batteries in the world today and represent approximately 60% of all battery sales. Lead-acid batteries find use in such diverse fields as automotive, lighting, power tools, and telephone systems. Lead-acid batteries typically employ two electrodes, a positive lead dioxide electrode and a negative metallic lead electrode. A sulfuric acid solution is used as the electrolyte.

The charge/discharge mechanism of lead-acid batteries is known as the "double-sulfate" reaction. During discharge, both the metallic lead of the negative electrode and the lead dioxide of the positive electrode are converted to lead sulfate. The reverse process occurs during battery charging, namely, lead sulfate is converted to metallic lead at the negative electrode and to lead dioxide at the positive electrode.

Although lead-acid batteries have numerous designs, many batteries employ lead or lead alloys as current collectors for electrodes. The current collectors may take on a variety of configurations, however, all are designed to mechanically hold the active material. The active material initially takes the form of a paste comprising active lead and lead oxides, water, and sulfuric acid. The paste is mechanically molded into the lead current collector to make a battery plate. The final battery is constructed by interleaving positive and negative battery plates using separators to maintain plate spacing. A more detailed discussion of lead-acid batteries may be found in Linden, Ed., *Handbook of Batteries and Fuel Cells*, (McGraw-Hill Book Company, New York), c. 1984, the disclosure of which is incorporated herein by reference.

A variety of battery components in numerous battery configurations are exposed to a sulfuric acid environment. In particular, lead-containing current collecting elements such as grids, lead spines in tubular batteries, Plante-type electrodes, thin film electrodes, made using lead sheets, and bipolar electrodes employ lead-containing surfaces which contact sulfuric acid.

Lead-acid batteries are extremely reliable and can be constructed to have long service lives. However, due to the nature of the battery environment, particularly the potentials generated at the positive plate, one of the main battery failure modes is corrosion. During corrosion, the lead current collector reacts with the acidic electrolyte and is converted into lead oxides. These reaction products are less dense than lead in the elemental form. As more reaction products form, the resultant stress in the oxide layers extrudes the current collector, a process termed "grid creep" when applied to grid extrusion. Grid creep is an irreversible mechanical distortion of a current collector such as a battery grid, resulting in separation of the active material and/or physical distortion of the entire battery. In severe cases of grid creep, the battery housing may crack as the current collector is forced against the walls of the battery. To avoid this problem, battery designers must include extra space in the battery housing to accommodate future expansion due to grid creep.

Numerous solutions have been proposed to alleviate the problem of grid creep in lead-acid batteries. One technique involves alloying the lead current collectors with various elements to increase their rigidity, and hence their resistance to grid creep. However, these alloying elements, which typically add strength through formation of precipitates within a lead matrix, increase the susceptibility of the material to corrosion. The design of the current collector itself can also enhance battery life by configuring to promote uniform mechanical expansion during corrosion. Increasing the thickness of the battery current collectors also increases their resistance to mechanical distortion.

However, these prior approaches to current collector design merely minimize the effects of grid creep. They do not deal with the fundamental problem of current collector corrosion. In U.S. Pat. No. 5,143,806 to Bullock et al., the disclosure of which is incorporated herein by reference, the problem of lead-acid battery grid corrosion is addressed through the formation of a protective layer of barium metaplumbate, $BaPbO_3$, on the lead battery grid. Barium metaplumbate is a conductive oxide having the perovskite crystal structure and is resistant to attack by sulfuric acid. Although use of barium metaplumbate alleviates grid creep, the method of the Bullock patent involves multiple processing steps. In the patent process, a layer of lead dioxide must first be formed upon the substrate, usually by electrochemical oxidation of the grid in a sulfuric acid bath. Following formation of the lead dioxide layer, the lead-dioxide-coated lead is covered with finely divided barium hydroxide which is heated for at least 8 hours in a stream of flowing oxygen to convert the lead dioxide layer to barium metaplumbate. The grid is then cooled to room temperature in 3 hours, soaked in a $NH_4Cl$ solution, and rinsed. This process is a time-consuming technique for forming barium metaplumbate. Although the patent parenthetically suggests that a sample could be dipped into molten $Ba(OH)_2.8H_2O$, it rejects this approach by warning that barium hydroxide is very sensitive to carbon dioxide and will easily convert in air to barium carbonate and then precipitate.

Thus, there is need in the art for improved processes for forming corrosion-resistant layers on substrates, especially lead battery current collectors. More particularly, there is a need in the art to rapidly and easily form barium metaplumbate layers on lead battery current collectors. Such processes would facilitate the fabrication of batteries with longer lives as well as permitting the use of thinner battery current collectors by protecting the current collectors from corrosion.

SUMMARY OF THE INVENTION

The present invention provides improved processes for forming anti-corrosion layers, particularly barium metaplumbate, on lead, lead alloy-, and lead oxide-containing substrates. The processes of the invention form corrosion-resistant current collectors which are assembled as part of a lead-acid battery. The inventive methods are used to form barium metaplumbate through a salt solution which includes a barium compound and a solvent salt.

In a first embodiment, a substrate material having at least a surface comprising elemental lead reacts with a salt solution in a single reaction step to form barium metaplumbate. The salt solution includes a barium compound and an oxidizing agent. The solvent salt Or barium compound may themselves be oxidizing agents, or an additional oxidant may be added to the solution. The salt solution is applied to the substrate in any known manner such as dipping, spraying, and brushing. Advantageously, a lead or lead alloy-containing substrate is dipped into a salt solution heated to a temperature at which a portion of the lead-containing substrate is directly converted to barium metaplumbate.

In a further embodiment of the invention, barium metaplumbate is formed on a lead oxide-containing substrate. This process employs a salt solution comprising a barium compound and a solvent salt to convert lead oxide to barium metaplumbate.

DETAILED DESCRIPTION

According to the invention, methods are provided for forming anti-corrosion layers, particularly barium metaplumbate ($BaPbO_3$), on substrates to be protected from corrosion. These substrates include lead-containing battery components such as current collectors. Current collectors include electrode configurations such as grids, sheets, tubes, bipolar electrodes, and the like. To form a barium metaplumbate layer on the substrate, a salt solution is used. As used herein, the term "salt" broadly denotes an ionic crystalline compound while the term "solution" denotes an essentially uniformly dispersed mixture, at the molecular or ionic level, of one or more substances (the solute) in one or more other substances (the solvent). The salt solution comprises a barium compound and a solvent salt.

In a first embodiment of the invention, barium metaplumbate is directly formed from a reaction between elemental lead and a salt solution without the need to first form a lead dioxide layer on the lead surface. The substrate may be any material, particularly conductive metals and ceramics. The substrate includes at least one exterior surface incorporating elemental lead, e.g., pure elemental lead or a lead alloy. The elemental lead may be an integral part of the substrate or formed as a layer on the substrate in any known manner. Lead or lead alloy current collectors for use in a lead-acid battery are examples of such substrates.

An oxidizing salt solution comprising a barium compound and a solvent salt is used to convert lead to barium metaplumbate. By employing a solvent salt, the barium compound is diluted to retard reaction with atmospheric carbon compounds. The solvent thus minimizes the undesirable formation of barium carbonate, a solid which is not soluble at the reaction temperature. Formation of barium carbonate depletes the barium available for reaction. The solvent salt dissolves the barium compound and is molten at the reaction temperature, i.e., a temperature on the order of the melting point of lead. Examples of suitable solvents include sodium chlorate ($NaClO_3$) and a eutectic composition of sodium nitrate ($NaNO_3$) and potassium nitrate ($KNO_3$) in a 1:1 molar ratio.

Suitable barium compounds for use in the salt solution include, but are not limited to, barium oxide, BaO, barium peroxide, $BaO_2$, and barium salts such as barium hydroxide, $Ba(OH)_2$, and hydrated barium hydroxides, such as $Ba(OH)_2 \cdot 8H_2O$. Mixtures of these compounds with each other or other barium compounds are also suitably employed in a salt solution for formation of barium metaplumbate.

The barium compound is diluted by the solvent salt in the salt solution. Advantageously, dilution retards carbonate formation to a substantial extent. The expression "carbonate formation to a substantial extent" denotes carbonate formation which depletes the initial concentration of barium in the salt solution by more than approximately 40%. In general, the barium compound should not constitute more than approximately 20 mole percent of the solution and is preferably less than 10 mole percent with 5 mole percent being an exemplary concentration based on solubility considerations and minimization of reaction with atmospheric carbon dioxide. The solvent salt additionally dissolves any decomposition products or dissociated species, if any, of the barium compound employed in the salt solution. By maintaining such species in solution, the amount of barium available to form barium metaplumbate is maintained.

Formation of barium metaplumbate requires lead to be oxidized to its $^+4$ valency. To render the salt solution sufficiently oxidizing, the solvent salt and/or barium compound can be an oxidant. An oxidizing additive or additives can also be supplied to the salt solution. Sodium chlorate is a strong oxidant capable of oxidizing lead to its $^+4$ valency. Additionally, sodium chlorate has a melting point of 255° C., substantially less than the 328° C. melting point of lead. Because of these desirable properties, sodium chlorate can be used as an oxidizing solvent or it can be added as an oxidant to other salt solutions.

The barium compound can itself be used as an oxidizing agent, such as barium peroxide. Because barium peroxide does not oxidize lead to its $^+4$ valency, an additional oxidizing agent is supplied to the reaction site. This additional oxygen can be supplied in the form of an oxygen-containing gas, such as $O_2$ or ozone, bubbled into the salt solution.

Advantageous compositions of salt solutions are given in Table I below (percentages indicate molar percent):

TABLE I

|   | $NaClO_3$ | K, Na Nitrate Eutectic | BaO | $BaO_2$ | $Ba(OH)_2 \cdot 8H_2O$ | $O_2$-containing gas |
|---|---|---|---|---|---|---|
| A | 20% | 75% | — | — | 5% | — |
| B | — | 80% | — | 20% | — | Yes |
| C | 80% | — | 20% | — | — | — |
| D | 90% | — | 10% | — | — | — |
| E | 90% | — | — | — | 10% | — |

In use, the components of the salt solution are applied to the substrate in any conventional manner including, but not limited to, spraying, brushing, and dipping. The salt solution can be applied in a molten state, or alternatively delivered in a finely divided form as a powder, suspension, paste, or slurry followed by heating to form a molten solution. Dipping the substrate into a molten solution is a suitable application technique.

For application by dipping, the pulverized salt solution constituents are placed in a suitable container and heated to form a molten solution. The solution is then heated to a temperature lower than the 328° C. melting point of lead, but high enough to permit the formation of barium metaplumbate at an acceptable rate. If the substrate is immersed in a molten salt solution for a short period of time, or the substrate has a higher melting point than that of lead, solution temperatures higher than 328° C. are useful. The substrate is immersed in a molten salt solution until a barium metaplumbate layer of desired thickness, e.g., thickness in the range of 5 to 20 microns, is obtained, usually for approximately 1–3 hours. During immersion, additional oxidant, e.g., an oxygen-containing gas, is optionally supplied in the form of, for example, $O_2$ or ozone bubbled to the reaction site. After removal from the salt solution, the substrate is cooled followed by rinsing in either water or a solution which removes the excess salt solution such as an aqueous $NH_4Cl$ solution.

In another embodiment of the present invention, barium metaplumbate is formed using a substrate having a pre-existing lead oxide surface. The lead oxide surface is a form of lead dioxide or a mixture of lead oxides. This embodiment uses a salt solution comprising a barium compound and a solvent salt. The lead oxide surface is part of a lead oxide-containing article, such as a battery current collector, or formed by converting a surface which includes elemental lead into a lead oxide. For the latter method, a layer including elemental lead is deposited through known methods, or a lead-containing substrate is employed. Oxidation to form the initial lead oxide is performed using any desired oxidation technique, examples of which include oxidation by sodium chlorate and electrochemical oxidation.

Once a lead oxide surface has been provided, the substrate is immersed in the salt solution which includes a barium compound dissolved in a solvent salt. The barium compounds and solvent salts described in the previous embodiment are useful in the salt solutions of this embodiment. Examples of salt solutions are given in the table below (percentages indicate molar percent):

TABLE II

|   | $NaClO_3$ | K, Na Nitrate Eutectic | BaO | $BaO_2$ | $Ba(OH)_2 \cdot 8H_2O$ | $O_2$-containing gas |
|---|---|---|---|---|---|---|
| A | 95% | — | — | — | 5% | Yes |
| B | 90% | — | — | — | 10% | Yes |

The solution constituents are mixed and melted as in the previous embodiment. The lead oxide-containing substrate is immersed in the molten salt solution to convert at least a portion of the lead oxide to barium metaplumbate. During immersion, it is possible to provide additional oxygen in the form of oxygen or ozone bubbled into the molten salt solution adjacent the substrate. The additional oxygen prevents lead dioxide decomposition.

The following examples are illustrative of the methods for forming barium metaplumbate according to the processes of the present invention. While the examples employ lead foils, it is understood that the nature of the inventive processes permit substrates of complex shapes, such as battery current collectors, to be coated.

EXAMPLE 1

Single-Step Process

Ground mixtures of 3.2 grams of BaO and 20.0 grams of $NaClO_3$ were placed in a 25 ml pyrex beaker. The beaker was placed in a Lindberg vertical tube furnace and held at 300° C. in air until the mixture was molten. Lead foils approximately 0.5 rail thick were produced from 99.999% pure lead. Foils were degreased for 2 minutes in acetone in an ultrasonic cleaner before use.

Foils were immersed in the molten salt solution for 3 hours. Following removal, the foils were cooled in air to room temperature. Carry-over salt films were removed from the foils by swirling them in water. Resistant salt films were removed by rinsing the foils in an ultrasonic field for 15 seconds in water or for one minute in 10 wt./vol/percent solution of $NH_4Cl$. The foils were then air-dried and sectioned for examination. X-ray diffraction patterns confirmed formation of $BaPbO_3$. Scanning electron microscopy indicated dense and continuous films.

EXAMPLE 2

Single-Step Process

The procedure of Example 1 was repeated with the salt mixture being 2.1 grams of $NaClO_3$, 1.6 grams of $Ba(OH)_2 \cdot 8H_2O$, and 7.0 grams of 1:1 $NaNO_3$:$KNO_3$.

As in example 1, X-ray diffraction confirmed the presence of $BaPbO_3$. Scanning electron microscopy of these films indicated some discontinuities on the substrate surface.

EXAMPLE 3

Lead Oxide Formation Followed by Conversion to Barium Metaplumbate

In this Example, lead foils were oxidized by immersion for 1 hour in 20 grams of molten $NaClO_3$ to form a dense, adherent oxide surface. The oxidized lead foils were then immersed in a molten salt solution of 20 grams of $NaClO_3$ and 6.3 grams of $Ba(OH)_2 \cdot 8H_2O$ at 300° C. for 3 hours. Dense and continuous $BaPbO_3$ films were formed.

Following formation of the barium metaplumbate layer, according to any of the processes described above, a further protective layer of lead and/or lead oxide may be deposited thereon. These layers aid in preventing attack of the barium metaplumbate layer in the battery environment. The lead and/or lead oxide layers may be applied through any known coating process.

The processes of the present invention find particular application in the protection of battery current collector components. Following formation of a barium metaplumbate layer on a lead or lead alloy battery collector component, such as a grid electrode (and, optionally, a lead or lead oxide layer on the barium metaplumbate), the battery current collectors are pasted with active material and assembled to form interleaving positive and negative plates of a lead acid storage battery. Separators are used to electrically insulate each plate from its nearest counterelectrode neighbors. The plates are assembled in a battery container and filled with a sulfuric acid-based electrolyte solution. The battery is sealed with a cover through which project the terminal posts.

While the foregoing invention has been described with reference to the preferred embodiments, modifications and changes are readily apparent to those skilled in the art. For example, numerous other lead battery components such as posts, straps, lugs, etc., may be treated by the inventive processes. According, such modifications and changes such as those suggested above, but not limited thereto, are considered to be within the scope of the present invention.

I claim:

1. A method for forming a battery having a current collector coated with a layer including barium metaplumbate comprising:

providing a current collector having at least one surface comprising lead or a lead oxide;

contacting the surface with a salt solution comprising at least one barium compound in a solvent salt in an amount sufficient to convert at least a portion of the surface to barium metaplumbate;

convening a portion of the surface to barium metaplumbate; and assembling the current collector into a battery.

2. A method for forming a battery as recited in claim 1 wherein the current collector is a grid.

3. A method for forming a battery having a current collector coated with a layer including barium metaplumbate comprising:

providing a current collector having at least one surface comprising elemental lead;

contacting the surface with a salt solution which includes at least one barium compound and an oxidizing agent in an amount sufficient to convert at least a portion of the elemental lead to barium metaplumbate;

converting a portion of the elemental lead to barium metaplumbate; and assembling the current collector into a battery.

4. A method for forming a battery as recited in claim 3 wherein the current collector is a grid.

5. A method for forming a battery as recited in claim 3 wherein the at least one barium compound is a barium salt.

6. A method for forming a battery as recited in claim 5 wherein the barium salt is selected from barium hydroxides and hydrated barium hydroxides.

7. A method for forming a battery as recited in claim 4 wherein the grid is selected from lead and lead alloy battery grids.

8. A method for forming a battery as recited in claim 3 wherein the step of contacting is performed by dipping the surface into a molten salt solution.

9. A method for forming a battery as recited in claim 3 wherein the oxidizing agent is a salt.

10. A method for forming a battery as recited in claim 9 wherein the salt is sodium chlorate.

11. A method for forming a battery as recited in claim 3 further comprising forming a layer of material selected from lead and lead oxide on the barium metaplumbate layer.

12. A method for forming a battery having a current collector coated with a layer including barium metaplumbate comprising:

providing a current collector having at least one surface including a lead oxide formed thereon;

contacting the lead oxide-including surface with a molten salt solution comprising a barium compound and a solvent salt;

convening at least a portion of the lead oxide-including surface to barium metaplumbate; and assembling the current collector into a battery.

13. A method for forming a battery as recited in claim 12 wherein the current collector is selected from lead, lead alloy, and lead oxide battery grids.

14. A method for forming a battery as recited in claim 12 wherein the step of contacting is performed by dipping the surface into a molten salt solution.

15. A method for forming a battery as recited in claim 10 further comprising forming a layer of material selected from lead and lead oxide on the barium metaplumbate.

16. A method for forming a layer of barium metaplumbate comprising:

providing an article having at least one surface comprising elemental lead;

contacting the at least one surface with a salt solution comprising at least one barium compound and an oxidizing agent in an amount sufficient to convert at least a portion of the elemental lead to barium metaplumbate; and convening a portion of the elemental lead to barium metaplumbate.

17. A method for forming a layer of barium metaplumbate as recited in claim 16 wherein the barium compound is selected from barium oxides, barium peroxides, and barium hydroxides.

18. A method for forming a layer of barium metaplumbate as recited in claim 16 wherein the oxidizing agent is a salt.

19. A method for forming a layer of barium metaplumbate as recited in claim 18 wherein the salt is sodium chlorate.

20. A method for forming a layer including barium metaplumbate comprising:

providing an article having at least one surface including a lead oxide formed thereon;

contacting the lead oxide-including surface with a molten salt solution comprising at least one barium compound and a solvent salt; and convening at least a portion of the lead oxide-including surface to barium metaplumbate.

21. A method for forming a layer including barium metaplumbate as recited in claim 20 wherein the step of contacting is performed by dipping the surface into a molten salt solution.

22. A method for forming a layer including barium metaplumbate as recited in claim 20 wherein the at least one barium compound is selected from barium oxides, barium peroxides, and barium hydroxides.

* * * * *